United States Patent
Aso et al.

(10) Patent No.: US 9,966,814 B2
(45) Date of Patent: May 8, 2018

(54) MOTOR HAVING A FAN COVER THAT IS LATCHED TO A FOOT PLATE, PUMP, AND METHOD FOR MANUFACTURING THE MOTOR

(71) Applicants: Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP); Yuto Urabe, Tokyo (JP)

(72) Inventors: Hiroki Aso, Tokyo (JP); Mamoru Kawakubo, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 429 days.

(21) Appl. No.: 14/432,594

(22) PCT Filed: Oct. 5, 2012

(86) PCT No.: PCT/JP2012/076041
§ 371 (c)(1),
(2) Date: Mar. 31, 2015

(87) PCT Pub. No.: WO2014/054184
PCT Pub. Date: Apr. 10, 2014

(65) Prior Publication Data
US 2015/0236561 A1  Aug. 20, 2015

(51) Int. Cl.
*H02K 5/22* (2006.01)
*H02K 17/08* (2006.01)
(Continued)

(52) U.S. Cl.
CPC .................. *H02K 5/22* (2013.01); *H02K 5/00* (2013.01); *H02K 5/02* (2013.01); *H02K 9/06* (2013.01);
(Continued)

(58) Field of Classification Search
CPC .. H02K 5/22; H02K 5/04; H02K 5/02; H02K 5/00; H02K 9/06; H02K 17/08; Y10T 29/49012
(Continued)

(56) References Cited

U.S. PATENT DOCUMENTS 7,999,423 B2   8/2011   Asou et al.
8,004,125 B2   8/2011   Asou et al.
(Continued)

FOREIGN PATENT DOCUMENTS

JP   H05-300699 A    11/1993
JP   2000-358343 A   12/2000
(Continued)

OTHER PUBLICATIONS

International Search Report of the International Searching Authority dated Dec. 18, 2012 for the corresponding international application No. PCT/JP2012/076041 (and English translation).

*Primary Examiner* — Michael Andrews
(74) *Attorney, Agent, or Firm* — Posz Law Group, PLC

(57) ABSTRACT

A motor includes a molded stator; a cooling fan assembled to an end of a shaft protruding from one end face of the molded stator; a fan cover that covers the cooling fan; a capacitor assembly box installed to the molded stator and having a capacitor incorporated therein; a foot plate installed to the molded stator; and a bracket provided on the other end side of the molded stator. The fan cover is formed with a latched to the capacitor assembly box and a claw latched to the foot plate; and holes and to which the claws are latched
(Continued)

are formed on the capacitor assembly box and the foot plate, respectively.

10 Claims, 5 Drawing Sheets

(51) Int. Cl.
  *H02K 9/06* (2006.01)
  *H02K 5/02* (2006.01)
  *H02K 5/00* (2006.01)
(52) U.S. Cl.
  CPC ........ *H02K 17/08* (2013.01); *Y10T 29/49012* (2015.01)
(58) Field of Classification Search
  USPC .................................. 310/43, 52–65, 89, 85
  See application file for complete search history.

(56) References Cited

U.S. PATENT DOCUMENTS

| | | | | |
|---|---|---|---|---|
| 2010/0320848 | A1* | 12/2010 | Asou | H02K 5/20 310/71 |
| 2011/0133584 | A1* | 6/2011 | Uchimura | H02K 7/1166 310/83 |
| 2011/0304225 | A1* | 12/2011 | Terashita | H02K 5/04 310/49.37 |
| 2012/0256499 | A1* | 10/2012 | Bader | H02K 1/185 310/43 |

FOREIGN PATENT DOCUMENTS

| | | |
|---|---|---|
| JP | 2007-082362 A | 3/2007 |
| JP | 2012-019617 A | 1/2012 |
| WO | 2008/136061 A1 | 11/2008 |

* cited by examiner

MOTOR HAVING A FAN COVER THAT IS LATCHED TO A FOOT PLATE, PUMP, AND METHOD FOR MANUFACTURING THE MOTOR

CROSS REFERENCE TO RELATED APPLICATION

This application is a U.S. national stage application of International Patent Application No. PCT/JP2012/076041 filed on Oct. 5, 2012, the contents of which are incorporated herein by reference.

TECHNICAL FIELD

The present invention relates to a motor, a pump, and a method for manufacturing the motor.

BACKGROUND

A conventional motor includes a cylindrical rotor; a stator formed into a cylindrical shape and having windings that are encased in a resin insulator and that are wound around an iron stator core that surrounds the rotor; a bearing housing installed on an inner peripheral portion of the resin insulator at one end of the stator; a bearing bracket engaging with the face of the other end of the stator; a rotation shaft supported by bearings provided in the bearing housing and the bearing bracket; an external fan installed at the end of the rotation shaft projecting from the face of one end of the stator; and a fan cover that surrounds the external fan and blows cooling air generated by the action of the external fan toward an outer peripheral portion of the stator (see, for example, Patent Literature 1 mentioned below).

In a conventional motor, when the motor is molded from a thermosetting resin, the stator is formed in such a manner that the outer periphery of the resin insulator and the outer periphery of the stator iron core are aligned along the same line. On the outer periphery of the stator, a plurality of stays are radially provided, each extending in an axial direction; and the stays are integrated with the resin insulator. The fan cover is attached to the outer periphery of the stays.

PATENT LITERATURE

Patent Literature 1: Japanese Patent Application Laid-open No. H5-300699

When a motor is mounted, for example, on a household pump, a member (a foot plate) for fixing the motor to a tank is used. However, the conventional motor described in Patent Literature 1 mentioned above does not include a foot-plate attachment portion for attaching the foot plate thereto or a capacitor-assembly-box attachment portion for attaching a capacitor assembly box thereto. Therefore, separate components for attaching the foot plate and the capacitor assembly box to the motor are required in order to attach the foot plate and the capacitor assembly box, respectively. Accordingly, the conventional motor cannot meet the need to further reduce costs.

SUMMARY

The present invention has been achieved in view of the above problems, and an objective of the present invention is to provide a motor, a pump, and a method for manufacturing the motor capable of achieving further cost reduction.

To solve the problem described above and achieve the objective, the present invention relates to a motor that includes: a molded stator having a rotor included therein and a stator molded from a thermosetting resin; a cooling fan assembled to an end of a rotor shaft protruding from one end face of the molded stator; a fan cover that covers the cooling fan; a capacitor assembly box installed to the molded stator and having a capacitor incorporated therein; a foot plate installed to the molded stator; and a bracket provided on other end side of the molded stator. The fan cover is formed with a claw that latches to the capacitor assembly box and a claw that latches to the foot plate, and holes to which the claws are latched are formed on the capacitor assembly box and the foot plate, respectively.

According to the present invention, the motor is configured in such a manner that a claw provided on the fan cover is latched to the foot plate or the like, and thus the separate components described above are not required, thereby enabling to achieve a further cost reduction.

DETAILED DESCRIPTION

Exemplary embodiments of a motor, a pump, and a method for manufacturing a motor according to the present invention will be described below in detail with reference to the accompanying drawings. The present invention is not limited to the embodiments.

First Embodiment

Figure 1:
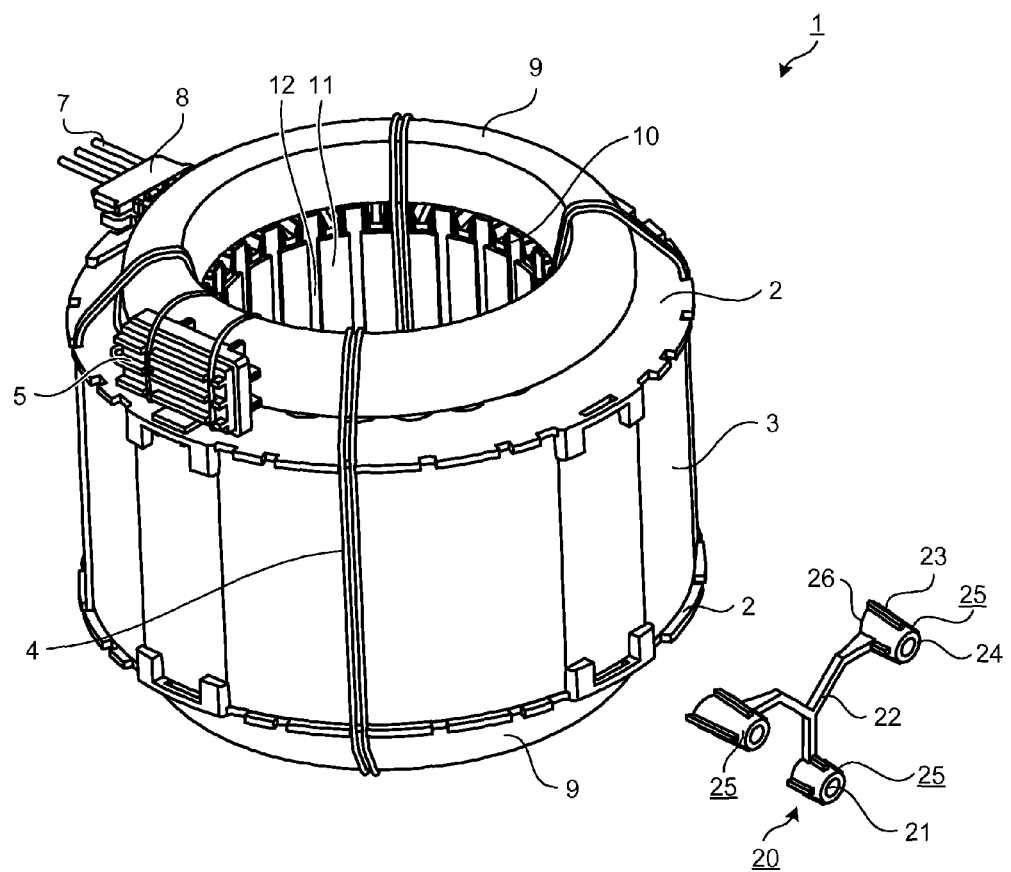
FIG. 1 is a perspective view of a stator according to first and second embodiments of the present invention.
Figure 2:
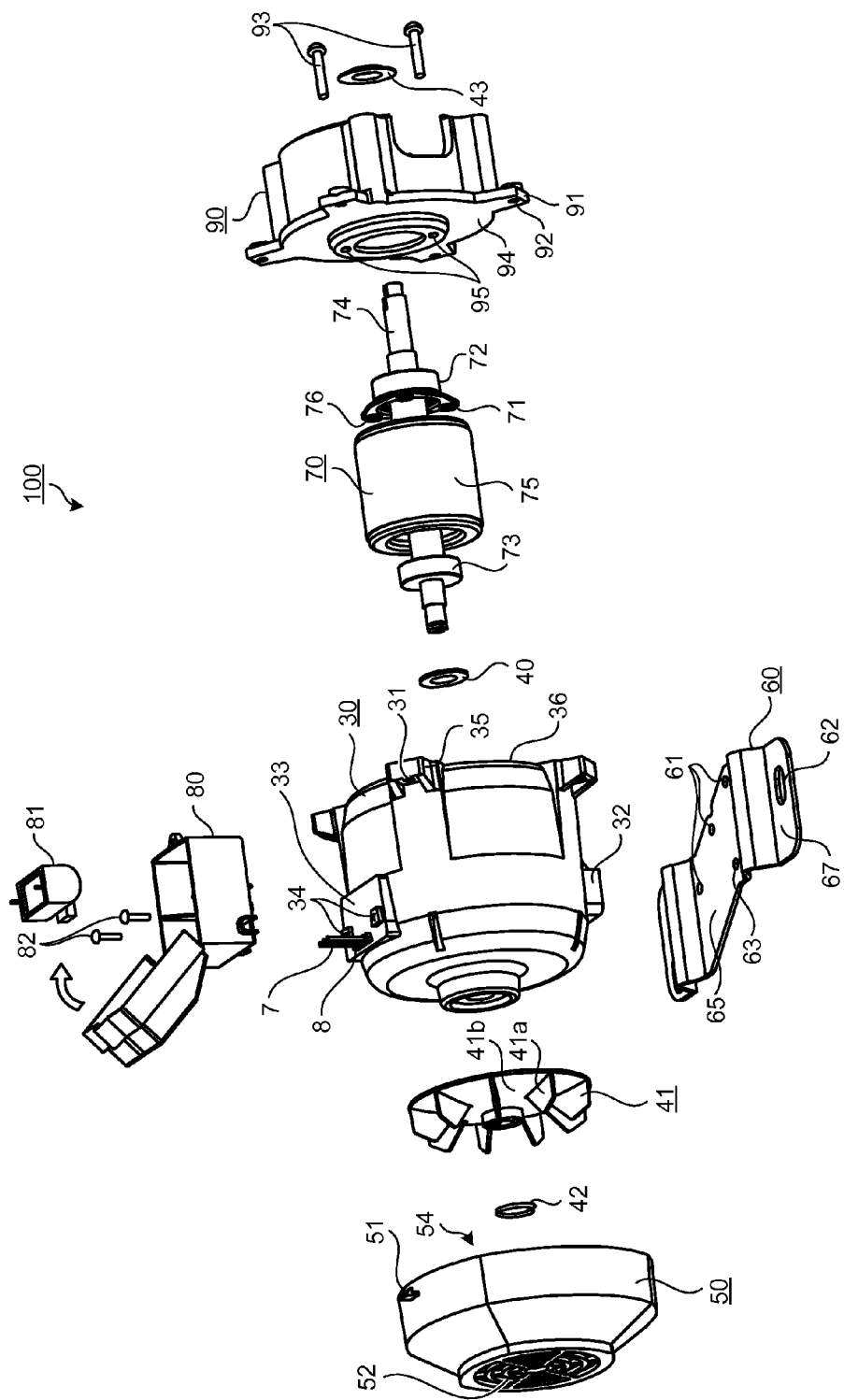
FIG. 2 is an exploded perspective view of a motor according to the first embodiment.
Figure 3:
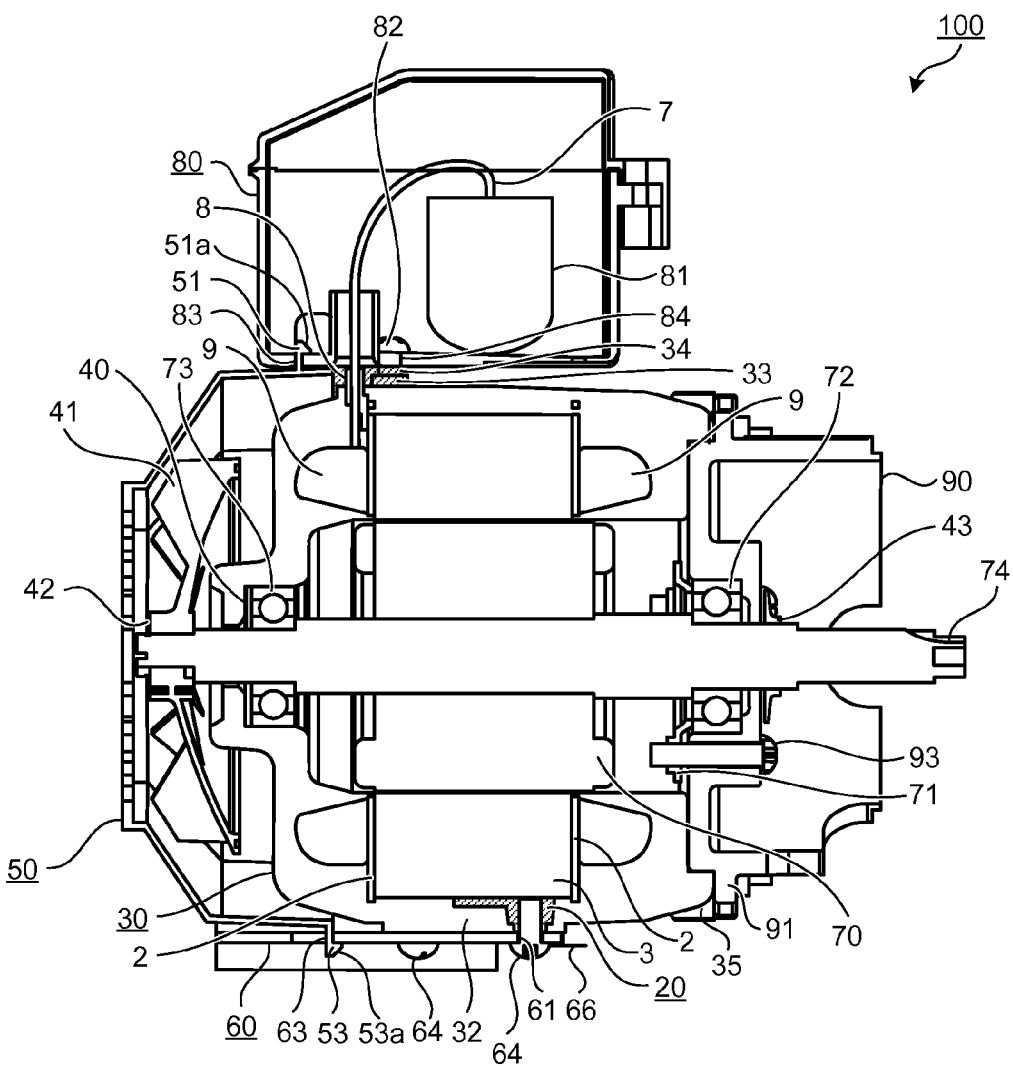
FIG. 3 is a sectional view of the motor illustrated in FIG. 2.

FIG. 1 is a perspective view of a stator 1 according to the first and second embodiments of the present invention. FIG. 2 is an exploded perspective view of a motor 100 according to the first embodiment, and FIG. 3 is a sectional view of the motor 100 illustrated in FIG. 2.

The stator 1 illustrated in FIG. 1 is used, for example, in a single-phase induction motor and is described as the stator 1 used in a single-phase induction motor in the present embodiment. A stator iron core 3 is formed by punching a magnetic steel sheet having a sheet thickness of between about 0.35 millimeters to 0.50 millimeters and stacking the magnetic steel sheets by using swaging, welding, or the like. End-face insulating plates 2 formed by molding a thermoplastic resin such as PBT (polybutylene terephthalate) are assembled to the both end faces of the stator iron core 3 in an axial direction. The end-face insulating plates 2 have a flat annular shape such that the outer diameter thereof is slightly larger than that of the stator iron core 3 and the inner diameter thereof is slightly larger than that of each slot (not illustrated) of the stator iron core 3. Notches (not illustrated) having substantially the same shape as that of the slots are formed on the inner diameter side of the end-face insulating plates 2.

A slot cell (not illustrated) being an insulating member that ensures insulation between adjacent slots; a wedge 10; and a coil (not illustrated) are inserted into each of the slots of the stator iron core 3. In the single-phase induction motor, a winding of the stator 1 includes a main winding and an auxiliary winding; and lead wires 7 are connected to the main winding and the auxiliary winding. The lead wires 7 are connected to a power supply and power is supplied to the main winding and the auxiliary winding. In the stator 1 of the single-phase induction motor, three lead wires 7 are used, i.e., two lead wires 7 connected to a coil terminal and one lead wire 7 connected to a protector described later. These three lead wires 7 are held together by a lead-wire lead-out portion 8 provided in a lead-wire lead-out component and are assembled to the stator iron core 3. The lead-wire lead-out component is arranged on an axial end face of the stator iron core 3 and is formed by molding a thermoplastic resin such as PBT. The lead-wire lead-out component includes a capacitor-assembly-box attachment portion (hereinafter, "box attachment portion") 33 having pilot holes for tapping screws (see FIG. 2). This means that the lead-wire lead-out component includes the lead-wire lead-out portion 8 and the box attachment portion 33.

The wedges 10 are used, when coils are inserted into the stator iron core 3, to prevent the coils from projecting out of a slot opening 12 of the stator iron core 3 toward the inner diameter side and are used to insulate the coils from the tip portions (inner diameter sides) of teeth 11. A binding string 4 is wound over an outer peripheral side of the stator iron core 3; outer portions of coil end portions 9; and the inner diameter sides of the teeth 11.

A protector that protects the motor 100 (e.g., interrupting an electric current when the temperature of the coils becomes equal to or higher than a predetermined temperature) is incorporated in a protector protection component 5. The protector protection component 5 is tied down to an outer portion of any of the two coil end portions 9 with the binding string 4.

As illustrated in FIGS. 2 and 3, a molded stator 30 is obtained by molding the stator 1 from a mold resin as a thermosetting resin. The box attachment portion 33 is formed on an outer peripheral portion of the molded stator 33; and the lead-wire lead-out portion 8 and a box attachment protrusion appear radially from an outer surface of the box attachment portion 33. Because an end of the lead-wire lead-out portion 8 appears from the box attachment portion 30, the lead wires 7 provided radially outward from the lead-wire lead-out portion 8 appear outside of the molded stator 30.

The box attachment protrusion appearing from the box attachment portion 33 includes pilot holes 34 for screws 82 (e.g., tapping screws) for fixing a capacitor assembly box 80 to the molded stator 30. For example, two pilot holes 34 are provided to appear from the radially outer surface of the box attachment portion 33. By providing the pilot holes 34, the capacitor assembly box 80 can be assembled to the molded stator 30 with the screws 82. Therefore, in the motor 100 according to the present embodiment, separate components for installing the capacitor assembly box 80 to the molded stator 30 do not need to be made unlike with the conventional techniques. Accordingly, the component cost can be reduced when compared with the conventional techniques.

As illustrated in FIGS. 2 and 3, a foot-plate attachment portion 32 is formed on the outer peripheral portion of the molded stator 30 on the opposite side to the box attachment portion 33. The foot-plate attachment portion 32 is molded out of a thermoplastic resin such as PBT integrally with a foot-plate attachment component 20 when molding the stator 1. Foot-plate installation surfaces 24 of a plurality of screw fastening portions 25 (see FIG. 1) constituting the foot-plate attachment component 20 appear from the foot-plate attachment portion 32 (see FIG. 3).

The foot-plate attachment component 20 illustrated in FIG. 1 is formed by connecting the plurality (for example, three) of screw fastening portions 25 to a thin portion 22. The screw fastening portions 25 are each formed in a cylindrical shape such that their diameters are enlarged as they approach a stator installation surface 26 from the foot-plate installation surface 24. The reason the screw fastening portions 25 have such a shape is to prevent the screw fastening portions 25 from radially dropping out of the stator 1 after the foot-plate attachment component 20 is molded together with the stator 1. Protrusions 23, a plurality thereof, are formed on the respective outer peripheral surfaces of the screw fastening portions 25 in order to prevent the screw fastening portions 25 from being rotated when screws 64 (e.g., tapping screws) are fastened to fix a foot plate 60 to the molded stator 30. A pilot hole 21 into which the screw 64 is screwed is formed on the foot-plate installation surface 24 of each of the screw fastening portions 25. The stator installation surface 26 is formed to meet an outer peripheral surface of the stator iron core 3.

The foot-plate attachment component 20 is configured in such a manner that the screw fastening portions 25 connect with the thin portion 22. Therefore, it is unnecessary for the screw fastening portions 25 to be individually set in a die, thereby enabling a reduction in the machining cost. The type of the foot-plate attachment component 20 and the attachment position thereof can be changed in accordance with the change of the attachment portion of the foot-plate attachment component 20 in the die.

The main configuration of the motor 100 illustrated in FIG. 2 is configured to include the molded stator 30, a cooling fan 41, a fan cover 50, the foot plate 60, a rotor assembly 70, a bracket 90, the capacitor assembly box 80, and a capacitor 81.

The molded stator 30 is integrally formed from a thermosetting resin in a state where the stator 1 and the foot-plate attachment component 20 illustrated in FIG. 1 are set at predetermined positions in a die. When molding the stator 1, molding is performed with the foot-plate attachment component 20 being pressed against the outer peripheral surface of the stator 1, whereby the mold resin is prevented from flowing out from between the stator installation surface 26 and the stator iron core 3 into the screw fastening portions 25. Accordingly, leakage of the mold resin onto the foot-plate installation surface 24 can be prevented and the quality of the molded stator 30 can be improved.

As illustrated in FIG. 2, the rotor assembly 70 includes a rotor 75, a shaft 74, two bearings 72 and 73, and a bearing cover 71. After a spring washer 40 is assembled to the molded stator 30 from the opposite side of the fan cover 50, and the rotor assembly 70 is assembled to the molded stator 30. The bracket 90 is then assembled to the molded stator 30 having the rotor assembly 70 assembled thereto but on the opposite side of the fan cover 50 of the molded stator 30.

Screws 93 are inserted into holes 95 provided on an inner diameter side of the bracket 90; and the bearing cover 71 is fixed by screwing the screws 93 into holes 76 of the bearing cover 71. Accordingly, displacement of the bearing 72 to the side of the rotor 75 during rotation of the rotor 75 can be reduced.

Legs 35, a plurality thereof, are provided on an outer peripheral surface of the molded stator 30. Each of the legs 35 is provided to extend in a radial direction near an end 36 of the molded stator 30 on the opposite side to the fan cover 50. The bracket 90 has a plurality of legs 91, each formed to extend radially outside of the bracket 90 on an end face 94 on the side of the molded stator 30. An axially penetrating hole 92 is formed in each of the legs 91; and an axially penetrating hole 31 is also formed in each of the legs 35. Therefore, by screwing screws (not illustrated), which have been inserted into the holes 92 of the legs 91, into the holes 31 of the legs 35, the bracket 90 assembled to the molded stator 30 is attached.

A flinger 43 is fitted to the shaft 74 so as to be close to the bracket 90, which prevents foreign matter from accumulating near a gap between the shaft 74 and the bracket 90, e.g., when the motor 100 is used with a pump.

The cooling fan 41 that cools the motor 100 is formed by molding a thermoplastic resin such as PA (polyamide). The cooling fan 41 includes a disk-shaped thin portion 41b and a plurality of blades 41a provided on the thin portion 41b on the opposite side to the molded stator 30. The cooling fan 41 is assembled to the shaft 74 of the rotor assembly 70 assembled to the molded stator 30, the shaft 74 protruding toward the outside of the molded stator 30. A C-ring 42 is then assembled to the shaft 74. Accordingly, contact between the blades 41a of the cooling fan 41 and the fan cover 50 can be avoided.

The fan cover 50 is installed to protect the cooling fan 41; is formed of a thermoplastic resin such as PA (polyamide), e.g., in a thin dome shape (a mortar shape); and is installed to the molded stator 30 so that an opening 54 thereof covers the cooling fan 41. The fan cover 50 has an air intake 52 at a position opposite to the blades 41a.

The fan cover 50 is formed with a claw 51 extending in a radial direction so as to be latched to the capacitor assembly box 80, and the fan cover 50 is formed with claw 53 extending in the radial direction so as to be latched to the foot plate 60. The claw 51 is formed to be latched to a hole 83 for fixing the fan cover, which is formed in the capacitor assembly box 80; and the claw 53 is formed to be latched to a hole 63 for fixing the fan cover 50, which is formed in the foot plate 60. In the present embodiment, the claw 51 is provided on an outer peripheral surface of the fan cover 50 as an example. However, the attachment position of the claw 51 is not limited to the outer peripheral surface of the fan cover 50.

The foot plate 60 is formed by compression molding of a sheet metal and includes a molded-stator installation surface 65 and a motor installation surface 67. A plurality of (e.g., three) holes 61, each corresponding respectively to one of the pilot holes 21 appearing from the foot-plate attachment portion 32 of the molded stator 30, and the holes 63 for fixing the fan cover 50 are formed in the molded-stator installation surface 65. The motor installation surface 67 is for installing the motor 100, for example, to a pump's tank, and a hole 62 for fixing the motor 100 is formed in the motor installation surface 67. By screwing the screws 64 (see FIG. 3), which have been inserted into the holes 61 of the molded-stator installation surface 65, into the holes 21 of the foot-plate attachment component 20, the foot plate 60 is fixed to the molded stator 30.

When the stator iron core 3 is grounded as illustrated in FIG. 3, the corresponding one of the screws 64 used for attaching a ground wire 66 has a length such that the end of the screw touches the stator iron core 3 when it is screwed into the foot plate 60. According to the configuration, separate components are not required for the stator iron core 3 to be grounded, thereby enabling a reduction in component costs.

The capacitor assembly box 80 is formed by molding a thermoplastic resin such as PP (polypropylene). In the capacitor assembly box 80, a plurality of (for example, two) holes 84, each corresponding to one of the pilot holes 34 appearing from the box attachment portion 33 of the molded stator 30, and a hole 83 for fixing the fan cover are formed. By screwing the screws 82, which have been inserted into the holes 92 of the capacitor assembly box 80, into the pilot holes 34 of the box attachment portion 33, the capacitor assembly box 80 is fixed to the molded stator 30.

When assembling the fan cover 50 to the molded stator 30, the claw 51 of the fan cover 50 is latched to the hole 83 of the capacitor assembly box 80; and the claw 53 of the fan cover 50 is latched to the hole 63 of the foot plate 60. Consequently, the fan cover 50 is fixed to the molded stator 30.

The lead wires 7 from the lead-wire lead-out portion 8 are pulled into the capacitor assembly box 80 installed to the molded stator 30; and the lead wires 7 pulled into the capacitor assembly box 80 are connected to the capacitor 81 assembled in the capacitor assembly box 80.

An operation of the motor 100 is described below. When the motor 100 is driven, the cooling fan 41 assembled to the shaft 74 rotates in conjunction with the rotor 75. Because of the rotation of the cooling fan 41, air is taken in from the air intake 52; and the air taken in from the air intake 52 circulates on the outer peripheral surface of the molded stator 30, thereby cooling the molded stator 30.

The manufacturing process of the motor 100 is described next.

(1) Step 1: First, the stator 1 is manufactured; and the rotor assembly 70, the bracket 90, the foot plate 60, the cooling fan 41, the fan cover 50, the capacitor assembly box 80, and the ground wire 66 are also manufactured.

(2) Step 2: The molded stator 30 is manufactured by molding the manufactured stator 1 and the foot-plate attachment component 20.

(3) Step 3: Drilling is performed until one of the pilot holes 21 provided in the foot-plate attachment component 20 reaches the stator iron core 3.

(4) Step 4: The spring washer 40, the rotor assembly 70, the bracket 90, and the screws 93 are assembled to the molded stator 30 in the order they appear in this sentence.

(5) Step 5: The cooling fan 41 is assembled to the molded stator 30, and the C-ring 42 is assembled to the shaft 74 protruding from the molded stator 30.

(6) Step 6: The foot plate 60 and the capacitor assembly box 80 are assembled to the molded stator 30. At this time, the ground wire 66 is assembled to the screws 64.

(7) Step 7: The claw 51 provided to the fan cover 50 is latched to the hole 83 of the capacitor assembly box 80; and the claw 53 provided to the fan cover 50 is latched to the hole 63 of the foot plate 60. Accordingly, the fan cover 50 is fixed to the molded stator 30.

(8) Step 8: Finally, the lead wires 7 pulled into the inside of the capacitor assembly box 80 are connected to the capacitor 81, thereby completing the motor 100.

According to the manufacturing process described above, the motor 100 including the cooling fan 41 can be efficiently manufactured.

The motor 100 according to the present embodiment is used, for example, as a drive unit for a household pump; and the component cost and the machining cost of the pump can be reduced by using the motor 100.

As described above, the motor 100 according to the first embodiment includes the molded stator 30 having the rotor 75 included therein and the stator 1 molded from a thermosetting resin; the cooling fan 41 assembled to the end of the rotor shaft (the shaft 74) protruding from one end face of the molded stator 30; the fan cover 50 that covers the cooling fan 41; the capacitor assembly box 80 installed to the molded stator 30 and having the capacitor 81 incorporated therein; the foot plate 60 installed to the molded stator 30; and the bracket 90 provided on the side of the other end of the molded stator 30. The claw 51 latched to the capacitor assembly box 80 and the claw 53 latched to the foot plate 60 are formed in the fan cover 50; and the holes 83 and 63 to which the claws 51 and 53 are latched, respectively, are formed in the capacitor assembly box 80 and the foot plate 60, respectively. According to the configuration, when assembling the fan cover 50, the claw 51 is latched to the hole 83 of the capacitor assembly box 80, and the claw 53 is latched to the hole 63 of the foot plate 60. Therefore, in the motor 100 according to the present embodiment, a separate component for installing the capacitor assembly box 80 to the molded stator 30 and a separate component for installing the foot plate 60 to the molded stator 30, as is the case with conventional techniques, are not needed; and workloads for assembling these separate components to the molded stator 30 can be omitted. As a result, the manufacturing cost and the labor time for the assembling separate components can be reduced; and not only cost reduction can be further achieved when compared with conventional techniques, but also volume reduction of the manufactured components can be achieved.

The claws 51 and 53 according to the first embodiment of the present invention are formed in a hook-like shape protruding from the outer peripheral surface of the fan cover 50 radially toward the outside of the molded stator 30. At the distal ends of the claws 51 and 53, inclined surfaces 51a and 53a are formed, inclining in such a manner that the protruding amounts on the side of the bracket 90 decrease as the ends are approached. According to the configuration, when pressing the fan cover 50 in the axial direction, the inclined surfaces 51a and 53a come into contact with the capacitor assembly box 80 and the foot plate 60, thereby deforming the opening 54 of the fan cover 50 radially inward to reduce its diameter, and thus the fan cover 50 can be easily assembled. As a result, the manufacturing cost of the motor 100 can be reduced.

The molded stator 30 according to the first embodiment of the present invention is formed with the foot-plate attachment portion 32 for attaching the foot plate 60 to the molded stator 30; and the plurality of pilot holes 21 for fastening the screws are formed in the foot-plate attachment portion 32 so as to appear from the outer peripheral surface of the molded stator 30. With the configuration, the foot plate 60 can be firmly assembled to the molded stator 30, thereby enabling to improve the quality of the motor 100.

The molded stator 30 according to the first embodiment of the present invention includes the foot-plate attachment component 20 in which the screw fastening portions 25 having the pilot holes 21 for fastening the screws are connected at the thin portion 22; and the pilot holes 21 are provided to appear from the outer peripheral surface of the molded stator 30. With the configuration, the screw fastening portions 25 do not need to be individually set in a die; and the foot plate 60 can be firmly assembled to the molded stator 30. As a result, the machining cost can be reduced and the quality of the motor 100 can be improved.

The molded stator 30 according to the first embodiment of the present invention is formed with the box attachment portion 33 that attaches the capacitor assembly box 80 to the molded stator 30; and the pilot holes 34 for fastening the screws are formed in the box attachment portion 33 so as to appear from the outer peripheral surface of the molded stator 30, and the lead-wire lead-out portion 8 is formed in the box attachment portion 33. According to the configuration, separate components for fixing the capacitor assembly box 80 to the molded stator 30 do not need to be manufactured, thereby enabling the component cost to be reduced.

Furthermore, the fan cover 50 according to the first embodiment of the present invention covers the cooling fan 41 and is formed in the mortar shape opening to a side facing the molded stator 30. The claws 51 and 53 are provided on an outer peripheral edge of the opening 54 of the fan cover 50 and provided from the outer peripheral edge radially toward the outside of the molded stator 30. According to the configuration, a claw can be provided at the end of the opening 54 of the fan cover 50 (see the claw 53 in FIG. 3). Therefore, because there is no undercut portion (a shape that cannot be demolded in an opening direction of a mold) in the fan cover 50, the mold for the fan cover can be simplified and the manufacturing cost of the fan cover can be reduced.

Second Embodiment

Figure 4:
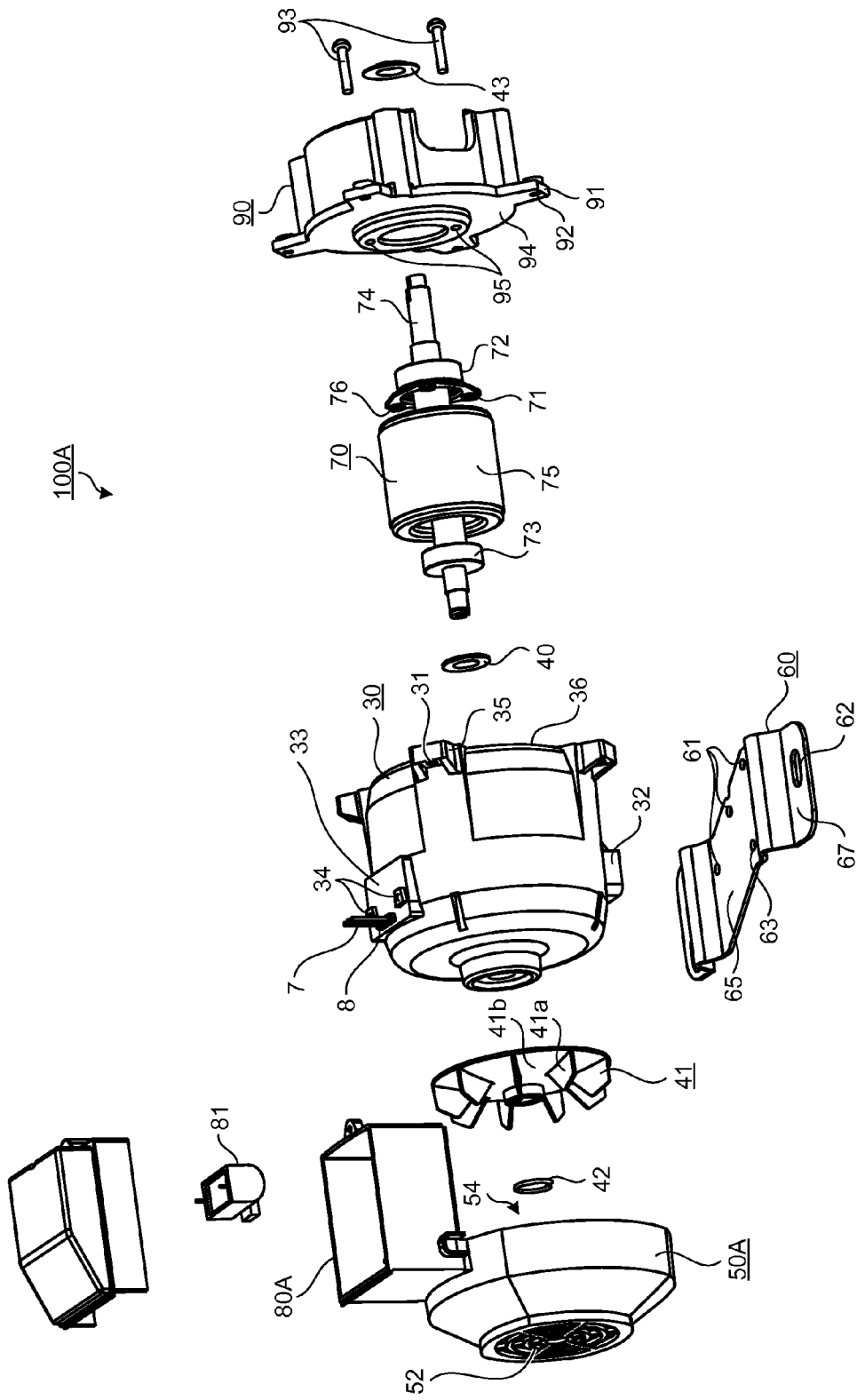
FIG. 4 is an exploded perspective view of a motor according to the second embodiment.
Figure 5:
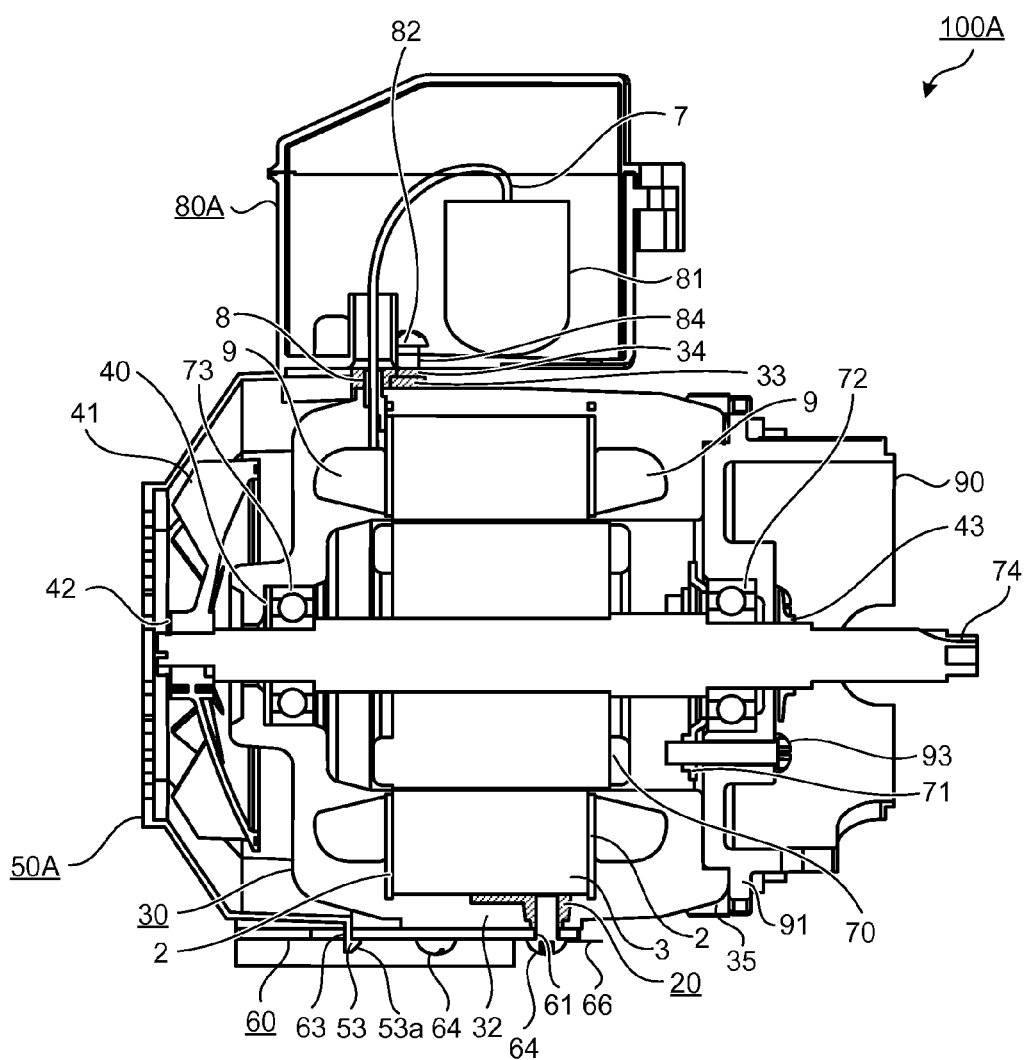
FIG. 5 is a sectional view of the motor illustrated in FIG. 4.

FIG. 4 is an exploded perspective view of a motor 100A according to the second embodiment, and FIG. 5 is a sectional view of the motor 100A illustrated in FIG. 4. The first embodiment is configured so that the claw 51 is latched to the capacitor assembly box 80 and the claw 53 is latched to the foot plate 60, thereby installing the fan cover 50. The second embodiment is configured in such a manner that a fan cover 50A having the claw 53 is manufactured integrally with a capacitor assembly box 80A; and the fan cover 50A is installed by latching the claw 53 to the foot plate 60. Portions that are the same as those in the first embodiment are denoted by like references to omit descriptions thereof, and only different portions are described here.

The motor 100A illustrated in FIG. 4 is configured to include, as a main configuration, the molded stator 30, the cooling fan 41, the fan cover 50A, the foot plate 60, the rotor assembly 70, the bracket 90, the capacitor assembly box 80A, and the capacitor 81. A difference between the first embodiment and the second embodiment is that the capacitor assembly box 80A and the fan cover 50A are used instead of the capacitor assembly box 80 and the fan cover 50.

The claw 51 according to the first embodiment is omitted in the fan cover 50A, and the hole 83 according to the first embodiment is omitted in the capacitor assembly box 80A. In the second embodiment, the fan cover 50A is manufactured integrally with the capacitor assembly box 80A.

As a procedure for assembling the capacitor assembly box 80A and the fan cover 50A to the molded stator 30, the foot plate 60 is fixed to the molded stator 30 by using the screws 64, and then the capacitor assembly box 80A is assembled to the molded stator 30 by using the screws 82. At this time, the claw 53 of the fan cover 50A is latched to the hole 63 of the foot plate 60. Accordingly, the fan cover 50A is fixed to the molded stator 30.

As described above, the fan cover 50A according to the second embodiment is integrally formed with the capacitor assembly box 80A and has the claw 53 latched to the foot plate 60. The hole 63, to which the claw 53 is latched, is formed in the foot plate 60. According to this configuration, when assembling the fan cover 50A, the claw 53 is latched to the hole 63 of the foot plate 60. Therefore, effects identical to those of the first embodiment are achieved by the motor 100A according to the second embodiment. Further, in the motor 100 according to the first embodiment, the fan cover 50 and the capacitor assembly box 80 need to be assembled to the molded stator 30 separately. However, in the motor 100A according to the second embodiment, because the fan cover 50A and the capacitor assembly box 80A are integrally formed, these components do not need to be assembled separately, thereby enabling a reduction in the assembly labor hours when compared with the first embodiment.

The motor, the pump, and the method for manufacturing a motor according to the embodiments of the present invention are merely examples of the present invention and can be further combined with other well-known techniques. It is obvious that the present invention can be configured with modification but without departing from the scope of the invention, such as omitting a part of the configuration.

INDUSTRIAL APPLICABILITY

As described above, the present invention can be applied to motors and pumps, and is particularly useful as an invention that can provide further improvement in quality.

The invention claimed is:

1. A motor comprising:
a molded stator;
a fan assembled to an end of a rotor shaft protruding from one end face of the molded stator;
a fan cover that covers the fan; and
a foot plate installed to the molded stator, wherein
the fan cover is formed with a claw that latches to the foot plate in a perpendicular direction to the rotor shaft,
a hole, to which the claw is latched, is formed in the foot plate, and
the claw has a hook that engages a radially outward-facing surface of the foot plate when the claw is fully latched to the foot plate.

2. The motor according to claim 1, wherein the fan cover is installed on the mold stator and is integrally formed with a capacitor assembly box in which a capacitor is installed.

3. The motor according to claim 1, wherein
the claw is formed in a hook-like shape protruding from an outer peripheral surface of the fan cover radially toward an outside of the molded stator, and
an inclined surface is formed at a distal end of the claw to incline in such a manner that a radially protruding amount decreases as the inclined surface approaches an end of the motor that is opposite to the fan cover in an axial direction of the motor.

4. The motor according to claim 1, wherein
the molded stator is formed with a foot-plate attachment portion for attaching the foot plate to the molded stator, and
a plurality of pilot holes for fastening screws are formed through the foot-plate attachment portion to appear from an outer peripheral surface of the molded stator.

5. The motor according to claim 1, wherein
the molded stator includes a foot-plate attachment component in which a plurality of screw fastening portions, each having a pilot hole for fastening a screw, make contact with a thin portion, and
the pilot holes are provided to appear from an outer peripheral surface of the molded stator.

6. The motor according to claim 1, wherein
the molded stator is formed with a capacitor-assembly-box attachment portion that attaches the capacitor assembly box, which is installed to the molded stator and which has a capacitor incorporated therein, to the molded stator, and
the capacitor-assembly-box attachment portion is formed with a plurality of pilot holes for fastening screws, and wherein the pilot holes appear from an outer peripheral surface of the molded stator, and wherein the capacitor-assembly-box attachment portion is also formed with a lead-wire lead-out portion.

7. The motor according to claim 1, wherein
the fan cover covers the fan and is formed in a mortar shape to open on a side facing the molded stator, and
the claw is provided on an outer peripheral edge of the opening of the fan cover and from the outer peripheral edge radially toward an outside of the molded stator.

8. A pump having the motor according to claim 1 mounted thereon.

9. The motor according to claim 1, wherein the claw is a first claw, and the fan cover is formed with
a second claw latched to a capacitor assembly box installed to the molded stator and having a capacitor incorporated therein, and
a hole to which the second claw is latched is formed in the capacitor assembly box.

10. A method for manufacturing a motor comprising:
a step of manufacturing a molded stator by molding a stator;
a step of assembling a rotor assembly, a bracket, a foot plate, and a capacitor assembly box to the molded stator;
a step of manufacturing the motor by latching claws provided on a fan cover to the foot plate of the motor and the capacitor assembly box, respectively, and
a step of engaging a hook of at least one of the claws with a radially outward-facing surface of the foot plate when latching the claws.

* * * * *